US011667863B2

(12) United States Patent
Hiraiwa et al.

(10) Patent No.: US 11,667,863 B2
(45) Date of Patent: Jun. 6, 2023

(54) BIOMASS SOLID FUEL MANUFACTURING METHOD AND BIOMASS SOLID FUEL MANUFACTURING DEVICE

(71) Applicant: Mitsubishi UBE Cement Corporation, Tokyo (JP)

(72) Inventors: Yuusuke Hiraiwa, Ube-shi (JP); Shigeya Hayashi, Ube-shi (JP); Nobuyuki Ooi, Ube-shi (JP)

(73) Assignee: MITSUBISHI UBE CEMENT CORPORATION, Tokyo (JP)

( * ) Notice: Subject to any disclaimer, the term of this patent is extended or adjusted under 35 U.S.C. 154(b) by 0 days.

(21) Appl. No.: 17/270,996

(22) PCT Filed: May 31, 2019

(86) PCT No.: PCT/JP2019/021773
§ 371 (c)(1),
(2) Date: Feb. 24, 2021

(87) PCT Pub. No.: WO2020/044696
PCT Pub. Date: Mar. 5, 2020

(65) Prior Publication Data
US 2021/0324285 A1 Oct. 21, 2021

(30) Foreign Application Priority Data
Aug. 27, 2018 (JP) .............................. JP2018-158583

(51) Int. Cl.
*C10L 5/44* (2006.01)
*C10B 47/30* (2006.01)
(Continued)

(52) U.S. Cl.
CPC .............. *C10L 5/442* (2013.01); *C10B 47/30* (2013.01); *C10B 53/02* (2013.01); *C10L 5/30* (2013.01)

(58) Field of Classification Search
CPC . C10L 5/442; C10L 5/30; C10B 47/30; C10B 53/02
See application file for complete search history.

(56) References Cited

U.S. PATENT DOCUMENTS 3,456,933 A * 7/1969 Brouk ....................... F27B 7/04
432/13
3,709,474 A * 1/1973 Kamstrup-Larsen ..... F27B 7/04
432/106

FOREIGN PATENT DOCUMENTS

CN 101231144 B * 6/2010
JP S49-015693 2/1974
(Continued)

OTHER PUBLICATIONS

International Preliminary Report on Patentability in International Application No. PCT/JP2019/021773 dated Mar. 11, 2021.
(Continued)

*Primary Examiner* — Latosha Hines
(74) *Attorney, Agent, or Firm* — Knobbe, Martens, Olson & Bear, LLP

(57) ABSTRACT

A biomass solid fuel manufacturing method, including: a heating step of carbonizing a biomass molded body formed by molding raw material biomass, in an external heating type rotary kiln, in which the rotary kiln includes a non-heating zone that is provided on an upstream side of a kiln body and is not provided with a heating unit on an outer circumference, the non-heating zone includes a spiral blade on an inner circumferential surface, and in the heating step, the biomass molded body is introduced to the non-heating zone of the kiln body.

3 Claims, 4 Drawing Sheets

(51) Int. Cl.
*C10B 53/02* (2006.01)
*C10L 5/30* (2006.01)

(56) References Cited

FOREIGN PATENT DOCUMENTS

| | | |
|---|---|---|
| JP | 2004-300185 | 10/2004 |
| JP | 2009-030860 | 2/2009 |
| JP | 2014-098097 | 5/2014 |
| JP | 2014098097 A * | 5/2014 |
| JP | 2015-067789 | 4/2015 |
| RU | 2002183 | 10/1993 |
| SU | 648808 | 2/1979 |
| SU | 1557440 | 4/1990 |
| WO | WO 2014/050964 | 3/2014 |
| WO | WO 2014/050964 | 4/2014 |
| WO | WO 2016/056608 | 4/2016 |

OTHER PUBLICATIONS

Office Action issued in corresponding Russian Patent Application No. 2021107780, dated Jun. 17, 2022.
Search Report issued in corresponding Russian Patent Application No. 2021107780, dated Jun. 15, 2022.

* cited by examiner

Fig.4
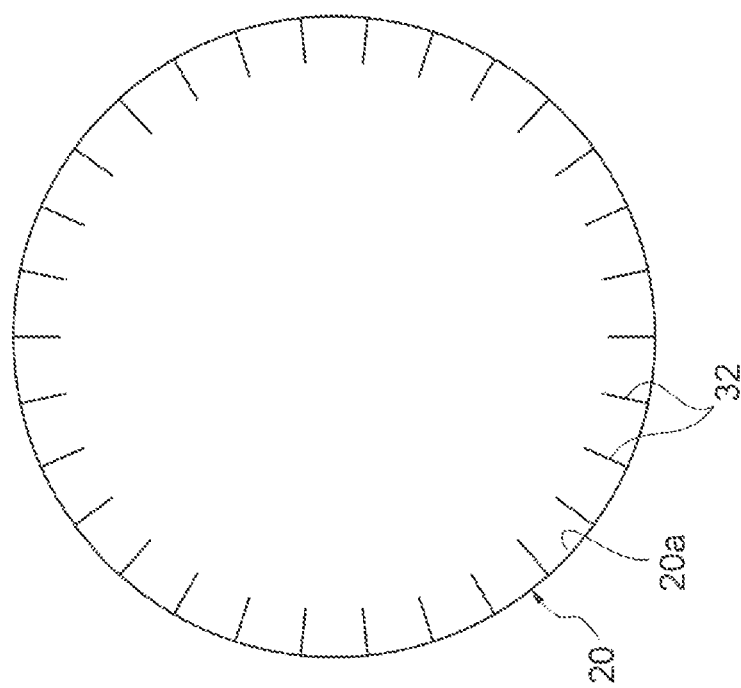
(b)
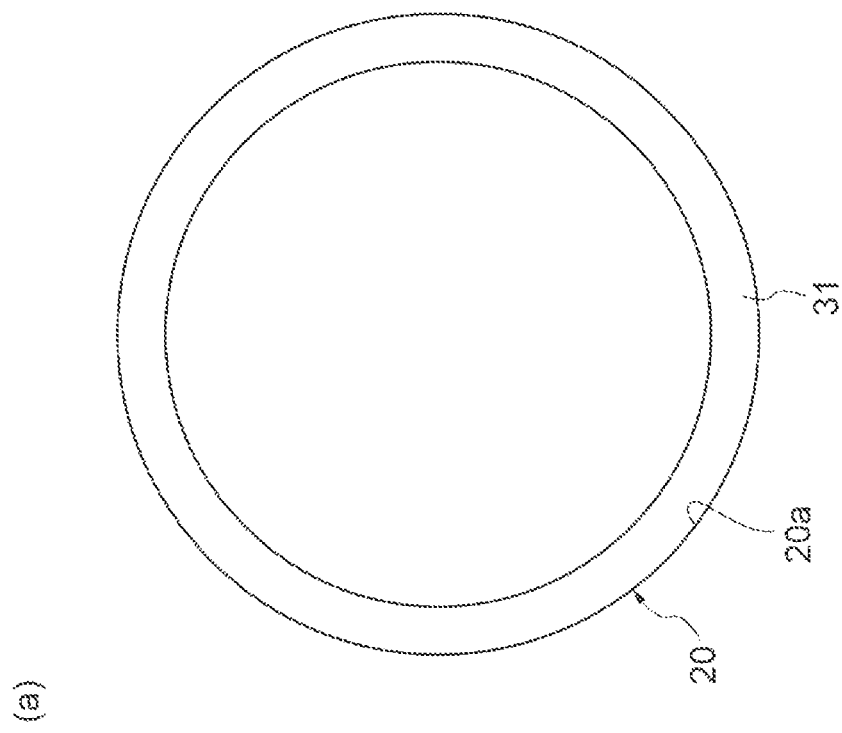
(a)

BIOMASS SOLID FUEL MANUFACTURING METHOD AND BIOMASS SOLID FUEL MANUFACTURING DEVICE

TECHNICAL FIELD

The present disclosure relates to a biomass solid fuel manufacturing method and a biomass solid fuel manufacturing device.

BACKGROUND ART

From the related art, a method for molding and then heating biomass has been considered as a method for manufacturing wood-based biomass solid fuel (for example, refer to Patent Literature 1).

CITATION LIST

Patent Literature

Patent Literature 1: International Publication WO 2016/056608

SUMMARY OF INVENTION

Technical Problem

In the case of manufacturing the biomass solid fuel by the method described in Patent Literature 1, an external heating type heating furnace is generally used for heating the biomass. However, in a case where the molded biomass is put in a heating furnace, the molding of the biomass may be collapsed by moisture vapor or the like that is generated from the biomass in the previous stage of the heating furnace, and the biomass may be attached to the heating furnace. In addition, self-heating properties of the biomass solid fuel that is obtained by heating the collapsed biomass may increase.

The present disclosure has been made in consideration of the circumstances described above, and an object thereof is to provide a biomass solid fuel manufacturing method and a biomass solid fuel manufacturing device that are capable of manufacturing biomass solid fuel in which an increase in self-heating properties is prevented while collapse during manufacturing is suppressed.

Solution to Problem

In order to attain the object described above, a biomass solid fuel manufacturing method according to one aspect of the present disclosure is a biomass solid fuel manufacturing method, including: a heating step of carbonizing a biomass molded body formed by molding raw material biomass, in an external heating type rotary kiln, in which the rotary kiln includes a non-heating zone that is provided on an upstream side of a kiln body and is not provided with a heating unit on an outer circumference, the non-heating zone includes a spiral blade on an inner circumferential surface, and in the heating step, the biomass molded body is introduced to the non-heating zone of the kiln body.

In addition, a biomass solid fuel manufacturing device according to one aspect of the present disclosure is a biomass solid fuel manufacturing device, including: an external heating type rotary kiln carbonizing a biomass molded body formed by molding raw material biomass, in which the rotary kiln includes a non-heating zone that is provided on an upstream side of a kiln body and is not provided with a heating unit on an outer circumference, and the non-heating zone includes a spiral blade on an inner circumferential surface.

According to the biomass solid fuel manufacturing method and the biomass solid fuel manufacturing device described above, in the non-heating zone on the upstream side of the rotary kiln carbonizing the biomass molded body, the spiral blade is provided on the inner circumferential surface. For this reason, the biomass molded body put in the rotary kiln is promptly moved to a downstream side by the spiral blade, in the non-heating zone in which the heating unit is not provided on the outer circumference. Therefore, the biomass molded body can be prevented from being collapsed in the non-heating zone, and thus, an increase in self-heating properties due to the carbonization of the collapsed biomass molded body can be prevented. As described above, according to the biomass solid fuel manufacturing method and the biomass solid fuel manufacturing device described above, biomass solid fuel in which an increase in the self-heating properties is prevented while the collapse during manufacturing is suppressed can be manufactured.

Here, in the rotary kiln, as an aspect, a carbonizing temperature in a heating zone in which the heating unit is provided on the outer circumference of the kiln body can be lower than 300° C.

In a case where the carbonizing temperature in the heating zone of the rotary kiln is lower than 300° C., an increase in the temperature of the non-heating zone adjacent to the heating zone is suppressed, and thus, the condensation of moisture vapor that is generated at the time of heating the biomass molded body comparatively easily occurs. In such a rotary kiln, the moisture may be attached to the biomass molded body in the non-heating zone, and the collapse may be accelerated. In contrast, the spiral blade is provided on the inner circumferential surface in the non-heating zone on the upstream side, and thus, the biomass molded body can be preferably prevented from being collapsed in the non-heating zone.

Advantageous Effects of Invention

According to the present disclosure, a biomass solid fuel manufacturing method and a biomass solid fuel manufacturing device capable of manufacturing biomass solid fuel in which self-heating properties are reduced while collapse during manufacturing is suppressed are provided.

BRIEF DESCRIPTION OF DRAWINGS

FIG. 4(*a*) and FIG. 4(*b*) are diagrams describing a blade inside the kiln body.

DESCRIPTION OF EMBODIMENTS

Figure 1:
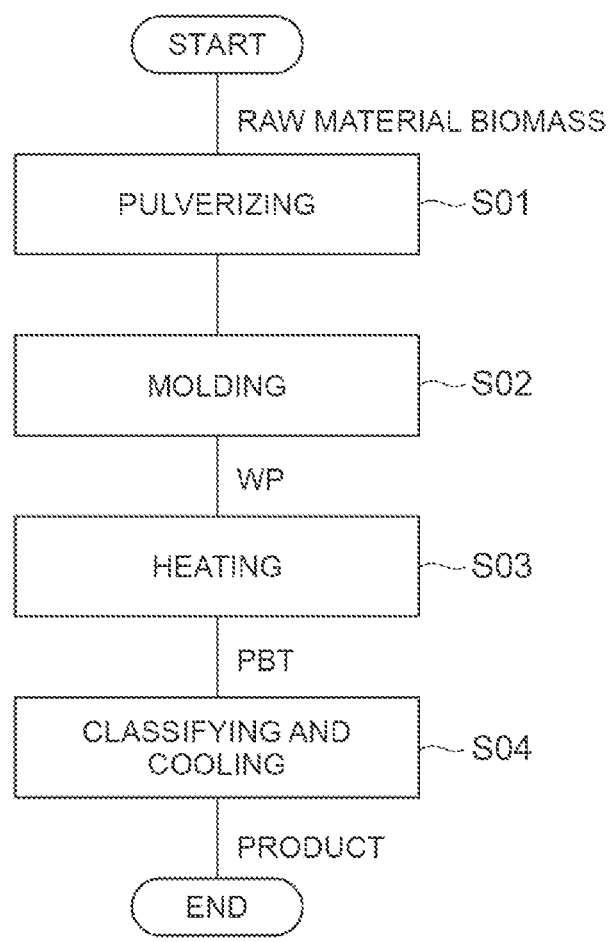
FIG. 1 is a flowchart describing the outline of a biomass solid fuel manufacturing method according to one aspect of the present disclosure.

Hereinafter, modes for carrying out the present disclosure will be described in detail, with reference to the accompanying drawings. Note that, in the description of the drawings, the same reference numerals will be applied to the same constituents, and the repeated description will be omitted.

FIG. 1 is a flowchart describing the outline of a biomass solid fuel manufacturing method according to one aspect of the present disclosure. As illustrated in FIG. 1, biomass to be a raw material of biomass solid fuel becomes a pellet type biomass molded body (white pellet: hereinafter, referred to as "WP") through a pulverizing step (S01) and a molding step (S02). WP is carbonized by being heated in a heating step (S03) and becomes biomass solid fuel (pelletizing before torrefaction: hereinafter, referred to as "PBT"). PBT, as necessary, becomes a product through a classifying and cooling step (S04).

The pulverizing step (S01) is a step of crushing and then pulverizing the biomass to be the raw material (raw material biomass). The type of biomass to be the raw material is not particularly limited, and can be selected from wood-based biomass and vegetational biomass. Tree species, a site, and the like of the biomass to be the raw material are not particularly limited, and for example, as one aspect, can be a raw material containing at least one type selected from the group consisting of gum tree, acacia, tree species of Dipterocarpaceae, *Pinus radiata,* and a mixture of larch, spruce, and birch. Larch, spruce, and birch may be independently used as the biomass that is the raw material, and a mixture of two or more types thereof, preferably three types thereof can be used. In addition, a raw material containing at least one type selected from the group consisting of a mixture of spruce, pine, and Japanese fir (may be a mixture of two types or three types thereof) can be used.

In addition, tree species other than the above may be further contained as the raw material. In one aspect of the present invention, the content of one or more types selected from the group consisting of gum tree, acacia, tree species of Dipterocarpaceae, *Pinus radiata,* and a mixture of larch, spruce, and birch is preferably greater than or equal to 50 weight %, and is more preferably greater than or equal to 80 weight %, and may be 100 weight %, with respect to the total weight of the biomass that is the raw material.

Note that, Douglas fir, Western hemlock, Japanese cedar, hinoki cypress, European red pine, old almond tree, almond shell, walnut shell, sago palm, an empty fruit bunch (EFB: a residue of palm oil processing), meranti, and the like may be used as the raw material.

A particle diameter of the biomass after being pulverized is not particularly limited, and can be approximately 100 μm to 3000 μm on average, and can be preferably 400 μm to 1000 μm on average. Note that, a known measurement method may be used as a measurement method of a particle diameter of a biomass powder.

The molding step (S02) is a step of molding the pulverized biomass into the shape of a lump by using a known molding technology. The biomass molded body (WP) that is a lump of the biomass after being molded can be a pellet or a briquette. The size of WP can be suitably changed. Note that, in the molding step, the pulverized biomass is molded by being compressed and pressurized without a binding agent such as a binder being added.

The heating step (S03) is a step of heating the biomass molded body (WP) at 150° C. to 400° C. (low-temperature carbonization) to obtain the biomass solid fuel (PBT) having strength and water resistance while retaining the shape as the molded body. The heating step is performed by using a biomass solid fuel manufacturing device 100 described below.

Note that, a heating temperature (heating temperature of PBT in kiln body 20: also referred to as a carbonizing temperature) is suitably determined in accordance with the shape and the size of the biomass to be the raw material and the lump, and is lower than 300° C. In addition, the heating temperature can be higher than or equal to 200° C. and lower than 300° C., and can be higher than or equal to 230° C. and lower than 300° C. In addition, the heating temperature may be 230° C. to 280° C. In addition, a heating time in the heating step is not particularly limited, and can be 0.2 hours to 3 hours.

The classifying and cooling step (S04) is a step of classifying and cooling PBT that is obtained in the heating step to be a product. The classification and the cooling may be omitted, or only one step thereof may be implemented. As necessary, the classified and cooled PBT becomes a solid fuel product.

It is preferable that in the biomass solid fuel obtained after the heating step (S03), a chemical oxygen demand (COD) of immersion water at the time of immersing the biomass solid fuel in water is less than or equal to 3000 ppm. Here, the chemical oxygen demand (COD) (also simply referred to as "COD") of the immersion water at the time of immersing the biomass solid fuel in water indicates a COD value obtained by preparing an immersion water sample for COD measurement in accordance with a calibration method of a metal or the like contained in the industrial waste of Japan Environment Agency Announcement No. 13 (A) in 1973, and by analyzing the sample by JIS K0102 (2016)-17.

In addition, in the biomass solid fuel obtained after the heating step, a hardgrove grindability index (HGI) based on JIS M 8801 is preferably greater than or equal to 15 and less than or equal to 60, and is more preferably greater than or equal to 20 and less than or equal to 60. In addition, in the biomass solid fuel, a BET specific surface area is preferably $0.15\ m^2/g$ to $0.8\ m^2/g$, and is more preferably $0.15\ m^2/g$ to $0.7\ m^2/g$. In addition, in the biomass solid fuel, equilibrium moisture after water immersion is preferably 15 wt % to 65 wt %, and is more preferably 15 wt % to 60 wt %.

In addition, in the biomass solid fuel obtained after the heating step, a fuel ratio (fixed carbon/volatile content) is 0.2 to 0.8, a dry-basis higher heating value is 4800 kcal/kg to 7000 kcal/kg, a molar ratio O/C of oxygen O to carbon C is 0.1 to 0.7, and a molar ratio H/C of hydrogen H to carbon C is 0.8 to 1.3. A physical property value of the biomass solid fuel after the heating step is set in the range described above, and thus, powdering can be reduced while COD in wastewater during storage is reduced and handleability during the storage can be improved. Note that, the physical property value of the biomass solid fuel, for example, can be set in the range described above by adjusting the tree species of the biomass that is used as the raw material, the site thereof, the heating temperature in the heating step, and the like. Note that, herein, a proximate analysis value, an element analysis value, and a higher heating value are based on JIS M 8812, 8813, and 8814.

In addition, in the biomass solid fuel obtained after the heating step, the highest achieving temperature of a self-heating property test is lower than 200° C. Note that, the self-heating property test is a test defined in "United Nations: Recommendations on the Transport of Dangerous Goods: Manual of Test Method and Criteria for Determination: 5th Edition: Self-Heating Property Test".

In addition, in a case where a bulk density of an unheated lump before the heating step (obtained by molding the pulverized biomass) is set to A, and a bulk density of a heated solid after the heating step is set to B, it is preferable that B/A=0.7 to 1. The value of the bulk density A is not particularly limited insofar as the value is within a known range in which the unheated lump is obtained by molding the biomass powder. In addition, the bulk density is also changed in accordance with the type of raw material biomass, and thus, may be suitably set. In addition, in a case where a hard glove hardgrove grindability index (HGI, described in JIS M 8801) of the unheated lump is set to H1, and HGI of the heated solid is set to H2, it is preferable that H2/H1 =1.1 to 2.5. Heating is performed such that the values of any one or both of B/A and H2/H1 described above are within the range described above, and thus, the biomass solid fuel in which the powdering is reduced while COD in wastewater during the storage is reduced and the handleability during the storage is improved can be obtained.

Figure 2:
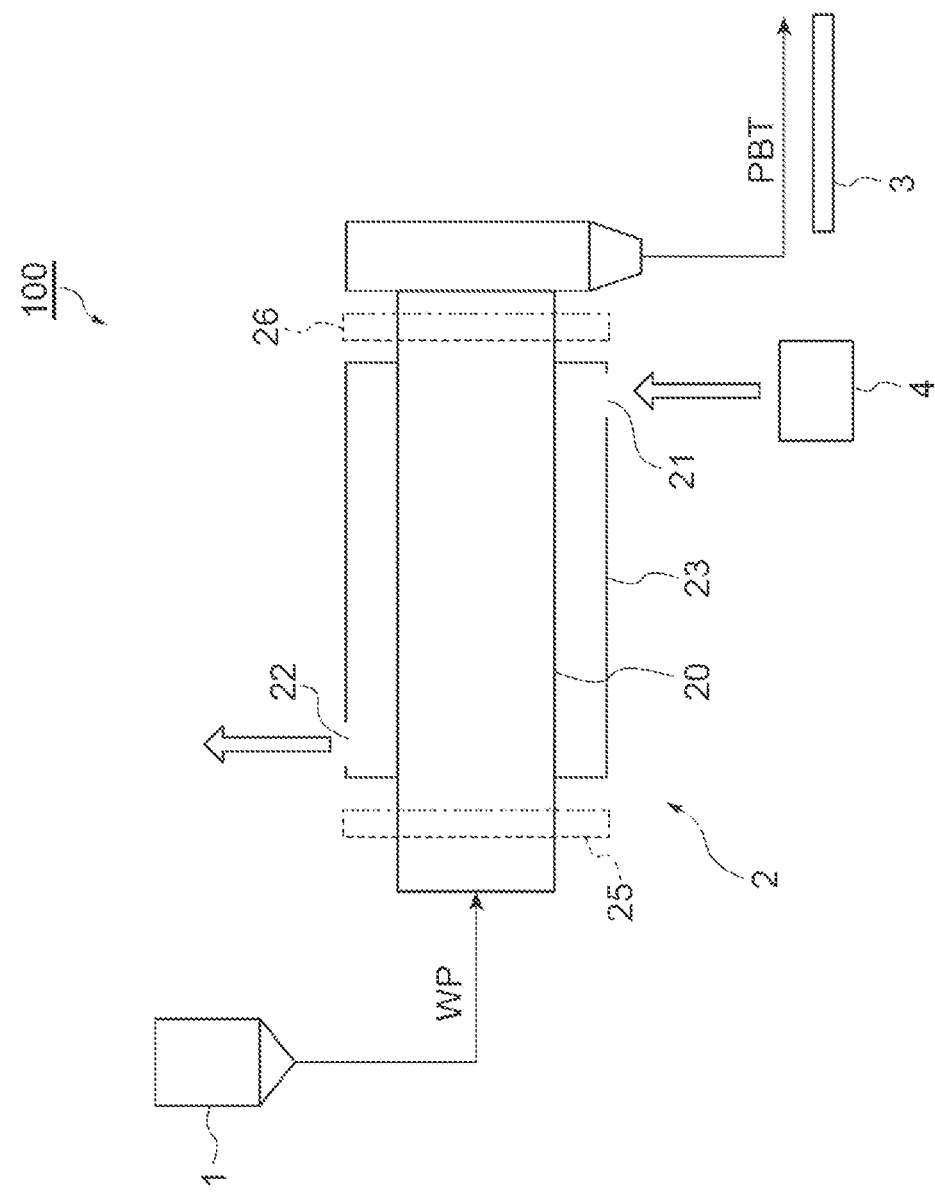
FIG. 2 is an outline configuration diagram of a biomass solid fuel manufacturing device according to one aspect of the present disclosure.

Here, the biomass solid fuel manufacturing device 100 that is used in the heating step (S03) will be described with reference to FIG. 2 to FIG. 4. FIG. 2 is a schematic configuration diagram describing the biomass solid fuel manufacturing device that is used in the heating step. As illustrated in FIG. 2, the biomass solid fuel manufacturing device 100 includes a hopper 1 and a rotary kiln 2 (a heating furnace). The hopper 1 and the rotary kiln 2 are controlled by a control unit (not illustrated).

The hopper 1 has a function of storing the biomass molded body (WP). WP stored in the hopper 1 is sequentially supplied to the rotary kiln 2, and heated in the rotary kiln 2. The biomass solid fuel (PBT) is manufactured by heating WP. PBT that is manufactured by the rotary kiln 2 is conveyed by a conveyer 3.

The rotary kiln 2 is a so-called external heating type rotary kiln. The rotary kiln 2 includes a kiln body 20 introducing WP that is an object to be heated to the inside to be heated (the low-temperature carbonization), and a heating unit heating the kiln body 20. The heating unit supplies hot gas from an external heat source 4 from a gas inlet 21 that is provided on the outer circumference side of the kiln body 20, and discharges the hot gas from a gas outlet 22 through a hot gas path 23. The hot gas path 23 is provided around the kiln body 20, and thus, the inside of the kiln body 20 is indirectly heated. That is, the hot gas path 23 functions as the heating unit heating the kiln body 20 in the rotary kiln 2. The external heat source 4 is controlled by a control unit (not illustrated), and thus, the temperature in the gas inlet 21 of the hot gas path 23 is suitably changed, and the temperature of the kiln body 20 of the rotary kiln 2 is controlled. Note that, the rotary kiln 2 of FIG. 2 is a counter flow-type rotary kiln in which a movement direction of the object (WP) to be heated (a direction directed toward the conveyer 3 side from the hopper 1 side) faces a movement direction of the hot gas, and may be a parallel flow-type rotary kiln. Note that, an oxygen concentration in the rotary kiln 2 is set to be less than or equal to 10%.

The kiln body 20 has an approximately cylindrical shape, in which the biomass molded body (WP) that is the object to be heated is introduced to the inside from an end portion on one side, and the biomass solid fuel (PBT) after being heated (the low-temperature carbonization) is discharged from an end portion on the other side. The kiln body 20 is supported to be rotatable around an axis line extending to the movement direction of WP, by a roller 25 on the upstream side and a roller 26 on the downstream side. That is, a central axis of the kiln body 20 is a rotational axis of the kiln body 20. The hot gas path 23 that is disposed on the outer circumference of the kiln body 20 is provided in a position that does not overlap with the rollers 25 and 26, that is, between the rollers 25 and 26. For this reason, the upstream side from the hot gas path 23 (a region interfering with the roller 25) and the downstream side from the hot gas path 23 (a region interfering with the roller 26) are a region in which the heating with the hot gas is difficult. Therefore, in the kiln body 20, an internal blade on the upstream side from the hot gas path 23 has a shape different from that of a blade provided in a region in which the hot gas path 23 is provided and on the downstream side.

Note that, the kiln body 20 is installed in a state of being inclined such that the upstream side (the hopper 1 side) is the upper side and the downstream side (the conveyer 3 side) is the lower side. An installation angle of the kiln body 20 can be suitably changed in accordance with the size of the kiln body 20, a movement rate of WP in the kiln body 20, or the like.

Figure 3:
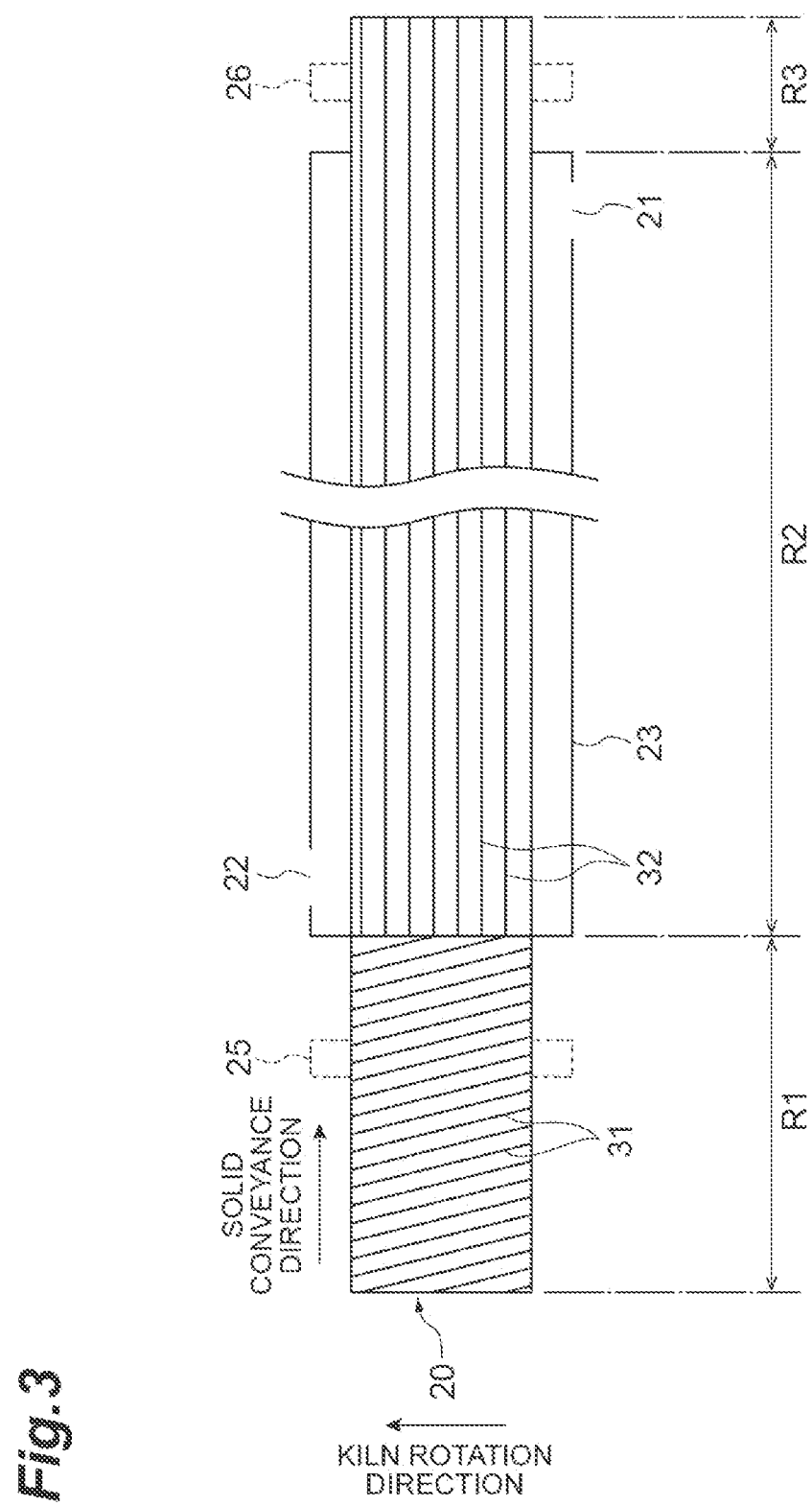
FIG. 3 is a diagram describing the inside of a kiln body of a rotary kiln.

FIG. 3 is a schematic view describing an internal structure of the kiln body 20 of the rotary kiln 2. In addition, FIG. 4 is a diagram describing the shape of the blade that is provided inside the kiln body 20.

As illustrated in FIG. 3, the inside of the kiln body 20 is configured of a first region R1, a second region R2, and a third region R3. The first region R1 and the third region R3 are a region in which the hot gas path 23 is not provided on the outer circumference of the kiln body 20, and become a non-heating zone. On the other hand, the second region R2 is a region in which the hot gas path 23 is provided on the outer circumference of the kiln body 20, and becomes a heating zone. In the heating zone, the inside of the kiln body 20 is heated to a predetermined temperature by the hot gas path 23.

Among the regions, a spiral blade 31 is provided in the first region R1 on the upstream side. A lifter blade 32 is provided in the second region R2 and the third region R3 on the downstream side from the first region R1. Note that, the boundary between the region in which the spiral blade 31 is provided and the region in which the lifter blade 32 is provided may not be coincident with the boundary between the first region R1 and the second region R2. Therefore, for example, the boundary between the region in which the spiral blade 31 is provided and the region in which the lifter blade 32 is provided may be provided in the first region R1. Note that, in the second region R2 to be the heating zone, the lifter blade 32 may be provided inside the kiln body 20, and thus, PBT can be preferably heated in the second region R2.

The spiral blade 31 of the first region R1 is formed into the shape of a spiral when seen along a rotational axis direction of the kiln body 20. Therefore, as illustrated in FIG. 4(*a*), in a sectional surface orthogonal to the rotational axis, the spiral blade 31 extends along an inner circumferential surface 20*a* of the kiln body 20. A winding direction of the spiral blade 31 (a spiral direction of the spiral blade 31) and a kiln rotation direction are formed to be different from each other when seen from a kiln inlet side. In addition, an inclination angle of the spiral blade 31 (the angle of the spiral blade 31 extending to the sectional surface orthogonal to the rotational axis direction) and a pitch (a pitch between the adjacent spiral blades 31 in an axis line direction on the inner circumferential surface 20*a*) can be suitably changed in accordance with the size of the kiln body 20, the length of the first region R1, an inclination angle of the kiln body 20, or the like. In addition, the number of turns of the blade may be suitably changed in accordance with the inclination angle of the spiral blade 31 and the length of the region in which the spiral blade 31 is provided (in this embodiment, the length of the first region R1).

The lifter blade 32 of the second region R2 and the third region R3 extends along a direction parallel to the rotational axis of the kiln body 20, and a plurality of blades are provided at a predetermined interval along the inner circumferential surface of the kiln body 20. As illustrated in FIG. 4(*b*), each of the plurality of lifter blades 32 protrudes toward the rotational axis direction from the inner circumferential surface 20*a* of the kiln body 20 on the sectional surface orthogonal to the rotational axis. The number of lifter blades 32 and the interval thereof are suitably changed.

When the heating step is performed, the kiln body 20 including the first region R1, the second region R2, and the third region R3 described above is rotated around the rotational axis by the rollers 25 and 26, at a predetermined number of rotations. In addition, the hot gas is supplied to the hot gas path 23 from the external heat source 4, and thus, in the inside of the kiln body 20, the second region R2 in which the hot gas path 23 is provided on the circumference is heated by the hot gas.

In a case where WP in put in such a kiln body 20 from the upstream side, first, WP is moved in the first region R1 in the kiln body 20, in accordance with the rotation of the kiln body 20. At this time, in the first region R1, the spiral blade 31 is provided on the inner circumferential surface 20*a*, and thus, WP is moved to the direction of the second region R2 while being extruded to the downstream side by the spiral blade 31.

Next, in a case where WP reaches the second region R2, WP is moved in the kiln body 20 while being pushed up to the upper portion by the lifter blade 32 on the inner circumferential surface 20*a*. The lifter blade 32 lifts WP, in accordance with the rotation of the kiln body 20, and drops WP by gravity. As described above, in the second region R2, WP is moved to the downstream side while being mixed by the lifter blade 32. In addition, in the region in which the hot gas path 23 is provided on the outer circumference, a space in the kiln body 20 is at a high temperature by the hot gas flowing through the hot gas path 23, and thus, WP is heated (the low-temperature carbonization) while being mixed by the lifter blade 32 in the kiln body 20. Accordingly, WP becomes PBT.

After that, PBT is moved in the third region R3 in which the lifter blade 32 is formed on the inner circumferential surface 20*a*, as with the second region R2, and is discharged to the outside of the kiln body 20 from the downstream side of the kiln body 20.

As described above, in the biomass solid fuel manufacturing device 100 according to this embodiment and the biomass solid fuel manufacturing method using the biomass solid fuel manufacturing device 100, the spiral blade 31 is provided on the inner circumferential surface 20*a*, in the first region R1 to be the non-heating zone on the upstream side of the kiln body 20 in the rotary kiln 2 carbonizing the biomass molded body (WP). For this reason, the biomass molded body put in the kiln body 20 of the rotary kiln 2 is promptly moved to the downstream side by the spiral blade 31, in the non-heating zone in which the hot gas path 23 as the heating unit is not provided on the outer circumference. Therefore, the biomass molded body can be prevented from being collapsed in the non-heating zone, and thus, an increase in the self-heating properties due to the carbonization of the collapsed biomass molded body can be prevented.

From the related art, it has been known that the biomass solid fuel is manufactured by heating the biomass molded body in the rotary kiln 2 (the low-temperature carbonization). However, on the structure of the rotary kiln 2, there are a heating zone in which heating is performed by external heating and a non-heating zone in which heating is not capable of being performed by external heating, in the kiln body 20 of the biomass molded body (WP). In the heating zone, moisture vapor is generated when WP is carbonized. The moisture vapor is condensed in the non-heating zone of which the temperature does not increase compared to the heating zone (in particular, on a side close to the outer circumference of the kiln body 20). The condensed moisture vapor may be attached to WP that is moved in the non-heating zone.

In particular, in a case where the moisture vapor (moisture) is attached to WP before being carbonized, water resistance of WP is low, and thus, WP may be collapsed and powdered. In this case, the shape of the biomass solid fuel after being carbonized is also collapsed, and thus, a collection rate of the biomass solid fuel having a predetermined shape may decrease. In addition, the collapsed and powdered WP may be attached to the inner circumferential surface, the blade, or the like in the kiln body 20, and thus, a function as the rotary kiln 2 may be impaired. Further, in the biomass solid fuel obtained by directly carbonizing the collapsed and powdered WP, heat is easily transmitted compared to the molded WP, and carbonization proceeds at a high temperature, and thus, the self-heating properties may increase.

In contrast, in the biomass solid fuel manufacturing device 100 according to this embodiment and the biomass solid fuel manufacturing method using the biomass solid fuel manufacturing device 100, the spiral blade 31 is provided on the inner circumferential surface 20*a* in the non-heating zone on the upstream side, that is, the region in which the biomass molded body before being carbonized is moved, in the kiln body 20. In a case where the spiral blade 31 is provided, the movement rate of the biomass molded body in the kiln body 20 increases, compared to the lifter blade of the related art. For this reason, a risk that the moisture vapor is attached to the biomass molded body before being heated can be reduced, and the biomass solid fuel in which the self-heating properties are reduced while collapse during manufacturing is suppressed can be manufactured.

Here, in the rotary kiln 2, the carbonizing temperature in the heating zone in which the heating unit is provided on the outer circumference of the kiln body 20 can be lower than 300° C. As described above, in a case where the carbonizing temperature in the heating zone (the second region R2) is lower than 300° C., in the kiln body 20 of the rotary kiln 2, an increase in the temperature in the non-heating zone that is adjacent to the heating zone is suppressed, and thus, the condensation of moisture vapor that is generated at the time of heating the biomass molded body comparatively easily occurs. In the general manufacturing step of the biomass solid fuel, heating is performed at a carbonizing temperature of higher than or equal to 500° C., and thus, the non-heating zone around the heating zone is also at a comparatively high temperature, and the condensation of the moisture vapor hardly occurs. On the other hand, as with the biomass solid fuel manufacturing device 100 of this embodiment, in a case where the carbonizing temperature is lower than 300° C., an increase in the temperature in the non-heating zone that is adjacent to the heating zone is reduced (for example, approximately lower than 100° C.). For this reason, the condensation of the moisture vapor easily occurs, and as a result thereof, the collapse and the powdering of the biomass molded body are accelerated. In such a rotary kiln 2, as described in this embodiment, in a case where the spiral blade 31 is provided on the inner circumferential surface in the non-heating zone on the upstream side, an effect of preventing the collapse and the powdering of the biomass molded body is remarkable, compared to the rotary kiln of the related art, and more effectively, the biomass solid fuel in which the self-heating properties are reduced while the collapse during manufacturing is suppressed can be manufactured.

Here, even in a case where the carbonizing temperature in the kiln body 20 is higher than or equal to 300° C., the configuration described in the above embodiment can be applied. In addition, even in a case where the carbonizing temperature in the kiln body 20 is higher than or equal to 300° C., an effect of enabling the biomass solid fuel in which the self-heating properties are reduced while the collapse during manufacturing is suppressed to be manufactured can be obtained by applying the configuration described in the above embodiment.

As described above, the embodiment of the present disclosure has been described, but the present disclosure is not limited to the embodiment described above, and various changes can be made.

For example, the configuration, the disposition, and the like of each part of the biomass solid fuel manufacturing device 100 including the rotary kiln 2 can be suitably changed. For example, the shape or the disposition of the inlet of the biomass molded body, the outlet of the biomass solid fuel, and the like can also be suitably changed.

REFERENCE SIGNS LIST

1: hopper, 2: rotary kiln, 3: conveyer, 4: external heat source, 20: kiln body, 20a: inner circumferential surface, 21: gas inlet, 22: gas outlet, 23: hot gas path, 31: spiral blade, 32: lifter blade.

The invention claimed is:

1. A biomass solid fuel manufacturing method, comprising: introducing a biomass molded body formed by molding raw material biomass into a non-heating zone of an rotary kiln; transferring the biomass molded body into a heating zone of the rotary kiln; carbonizing the biomass molded body, in the heating zone of the rotary kiln, wherein: the non-heating zone extends axially along an upstream side of a cylindrical kiln body and is not provided with a heater on an outer circumference, the heating zone extends axially along a downstream side of the non-heating zone and is provided with a heater on an outer circumference thereof such that the inner circumference thereof is heated, the non-heating zone includes a spiral blade on an inner circumferential surface configured to transfer the biomass molded body from the non-heating zone to the heating zone, the heating zone includes a lifter blade extending axially along an entire length of an inner circumferential surface thereof, the lifter blade protrudes toward a rotational axis of the rotary kiln from the inner circumferential surface of the heating zone.

2. The biomass solid fuel manufacturing method according to claim 1,
wherein in the rotary kiln, a carbonizing temperature in a heating zone in which the heating unit is provided on the outer circumference of the kiln body is lower than 300.degree. C.

3. A biomass solid fuel manufacturing device, comprising:
an external heating type rotary kiln carbonizing a biomass molded body formed by molding raw material biomass, wherein:
the rotary kiln includes a non-heating zone extends axially along an upstream side of a cylindrical kiln body and is not provided with a heater on an outer circumference,
the rotary kiln further includes a heating zone that extends axially along a downstream side of the non-heating zone and is provided with a heater on an outer circumference thereof such that the inner circumference thereof is heated,
the non-heating zone includes a spiral blade on an inner circumferential surface configured to transfer the biomass molded body from the non-heating zone to the heating zone,
the heating zone includes a lifter blade extending axially along an entire length of an inner circumferential surface thereof, and
the lifter blade protrudes toward a rotational axis of the rotary kiln from the inner circumferential surface of the heating zone.

\* \* \* \* \*